United States Patent
Fukuda et al.

(10) Patent No.: US 10,417,071 B2
(45) Date of Patent: Sep. 17, 2019

(54) ARITHMETIC DEVICE AND CONTROL APPARATUS

(71) Applicant: OMRON Corporation, Kyoto (JP)

(72) Inventors: Yasunori Fukuda, Moriyama (JP); Masaichi Takai, Ritto (JP); Shigeyuki Eguchi, Joyo (JP); Yasuhiro Nishimura, Kyoto (JP)

(73) Assignee: OMRON Corporation, Kyoto (JP)

( * ) Notice: Subject to any disclaimer, the term of this patent is extended or adjusted under 35 U.S.C. 154(b) by 112 days.

(21) Appl. No.: 15/705,291

(22) Filed: Sep. 15, 2017

(65) Prior Publication Data

US 2018/0101383 A1    Apr. 12, 2018

(30) Foreign Application Priority Data

Oct. 7, 2016   (JP) ................................ 2016-199583

(51) Int. Cl.
*G06F 11/07* (2006.01)
*G05B 19/042* (2006.01)

(52) U.S. Cl.
CPC ...... *G06F 11/0736* (2013.01); *G05B 19/0428* (2013.01); *G06F 11/0757* (2013.01); *G05B 2219/24125* (2013.01)

(58) Field of Classification Search
CPC ............ G06F 11/0721; G06F 11/0736; G06F 11/0757
USPC .................... 714/10–13, 30, 31, 55
See application file for complete search history.

(56) References Cited

U.S. PATENT DOCUMENTS

| | | | |
|---|---|---|---|
| 4,118,792 A | 10/1978 | Struger et al. | |
| 5,560,033 A | 9/1996 | Doherty et al. | |
| 7,174,483 B2 * | 2/2007 | Becher | G06F 11/0757 714/23 |

(Continued)

FOREIGN PATENT DOCUMENTS

| | | |
|---|---|---|
| DE | 102006013381 | 9/2007 |
| EP | 2557502 | 2/2013 |

(Continued)

OTHER PUBLICATIONS

"Search Report of Europe Counterpart Application", dated Mar. 7, 2018, p. 1-p. 9.

*Primary Examiner* — Joseph R Kudirka
(74) *Attorney, Agent, or Firm* — JCIPRNET

(57) ABSTRACT

An arithmetic device and a control apparatus capable of executing a process according to an event occurring in one or more functional units connected through a communication circuit are provided. The arithmetic device configuring the control apparatus includes: a communication circuit for exchanging data with the functional units through the communication line; a processor for executing at least one of an arithmetic processing using data acquired from the functional units and a generation processing of data to be transmitted to the functional units; and a monitoring circuit connected to the communication circuit and the processor, and includes: a detection unit that detects an event occurring in the arithmetic device; a storage unit that stores a message associated with each event; and a start unit that gives an instruction to the communication circuit in accordance with the detected event to transmit a message associated with the detected event.

9 Claims, 9 Drawing Sheets

(56) References Cited

U.S. PATENT DOCUMENTS

| | | | | |
|---|---|---|---|---|
| 8,042,009 B2* | 10/2011 | Takaishi | ............. | G06F 11/0757 |
| | | | | 714/47.1 |
| 9,058,419 B2* | 6/2015 | Costin | ................... | B60W 50/04 |
| 9,170,896 B2* | 10/2015 | Ono | ................... | G06F 11/2028 |
| 10,006,455 B2* | 6/2018 | Tajima | .................... | G06F 11/07 |
| 2006/0112315 A1 | 5/2006 | Pfeufer et al. | | |
| 2016/0216704 A1* | 7/2016 | Koh | ................... | G05B 19/0425 |

FOREIGN PATENT DOCUMENTS

| | | |
|---|---|---|
| EP | 3048499 | 7/2016 |
| JP | 2015-090548 | 5/2015 |

* cited by examiner

ARITHMETIC DEVICE AND CONTROL APPARATUS

CROSS-REFERENCE TO RELATED APPLICATION

This application claims the priority benefit of Japan application serial no. 2016-199583, filed on Oct. 7, 2016. The entirety of the above-mentioned patent application is hereby incorporated by reference herein and made a part of this specification.

BACKGROUND OF THE INVENTION

Field of the Invention

The present invention relates to an arithmetic device constituting a control apparatus including one or more functional units and a control apparatus thereof.

Description of Related Art

As major components used for realizing various kinds of factory automation (FA), control apparatuses such as programmable logic controllers (PLC) are widely used. In order to perform intensive control on operations of various machines and facilities, such control apparatuses need to have fault tolerance for continuing a control operation and a fail-safe function for safely stopping a machine or a facility serving as a control target, and the like even when any fault, abnormality, or the like occurs.

In such a PLC, when an event such as a fault or an abnormality occurs, a function for notifying the outside is mounted. For example, Japanese Unexamined Patent Application Publication No. 2015-090548 (Patent Document 1) discloses a configuration in which an event process is performed by executing a monitoring program using a CPU.

PRIOR ART DOCUMENTS

Patent Documents

[Patent Document 1] Japanese Unexamined Patent Application Publication No. 2015-090548

SUMMARY OF THE INVENTION

A control apparatus such as a PLC includes various functional units such as an input/output unit, a counter unit, and a temperature adjusting unit. Such functional units may be either directly connected to an arithmetic device (also referred to as a central processing unit (CPU)) executing a user program or the like or connected to the arithmetic device through a field network or the like.

When an event such as a certain fault or an abnormality occurs in an arithmetic device, it is preferable that the occurrence of the event is instantaneously notified to such a functional unit, and necessary processing is executed in each functional unit. However, the configuration disclosed in Patent Document 1 as described above is in consideration of giving a notification of an event to an external server apparatus or the like, but does not consider an event notification given from an arithmetic device to each functional unit.

An object of the present invention is to provide a new configuration capable of executing processing according to an event occurring in one or a plurality of functional units connected through a communication circuit.

According to one aspect of the present invention, there is provided an arithmetic device constituting a control apparatus. The arithmetic device includes: a communication circuit that is used for exchanging data with one or a plurality of functional units through a communication line; a processor that is used for executing a user program to perform at least one of an arithmetic processing using data acquired from the one or plurality of functional units and a generation processing of data to be transmitted to the one or plurality of functional units; and a monitoring circuit that is connected to the communication circuit and the processor. The monitoring circuit includes: a detection unit that detects an event occurring in the arithmetic device; a storage unit that stores a message associated with each event; and a start unit that gives an instruction to the communication circuit in accordance with the event detected by the detection unit and transmits the message, which is stored in the storage unit, associated with the detected event from the communication circuit.

Preferably, the detection unit includes a watch dog timer that monitors soundness of an operation of the processor.

Preferably, the arithmetic device further includes a memory that can be used by the processor, and the detection unit detects an abnormality occurring in the memory.

Preferably, the detection unit monitors a communication abnormality in the communication circuit.

Preferably, the detection unit detects shutoff of power supply to the arithmetic device.

Preferably, the message includes a command for transitioning to an operation state in which the operation of each functional unit is limited.

Preferably, the message includes information representing content of an associated event.

Preferably, the processor stores the message in the storage unit by executing a program before start of execution of the user program.

Preferably, the monitoring circuit is mounted using an FPGA or an ASIC.

According to another aspect of the present invention, there is provided a control apparatus including: an arithmetic device; and one or a plurality of functional units. The arithmetic device includes: a communication circuit that is used for exchanging data with one or a plurality of functional units through a communication line; a processor that is used for executing a user program executing at least one of an arithmetic processing using data acquired from the one or plurality of functional units and a process of generating data to be transmitted to the one or plurality of functional units; and a monitoring circuit that is connected to the communication circuit and the processor. The monitoring circuit includes: a detection unit that detects an event occurring in the arithmetic device; a storage unit that stores a message associated with each event; and a start unit that gives an instruction to the communication circuit in accordance with the event detected by the detection unit and transmits the message, which is stored in the storage unit, associated with the detected event from the communication circuit.

According to the present invention, a process according to an occurring event can be executed in one or a plurality of functional units connected through a communication circuit.

DESCRIPTION OF THE EMBODIMENTS

Figure 1:
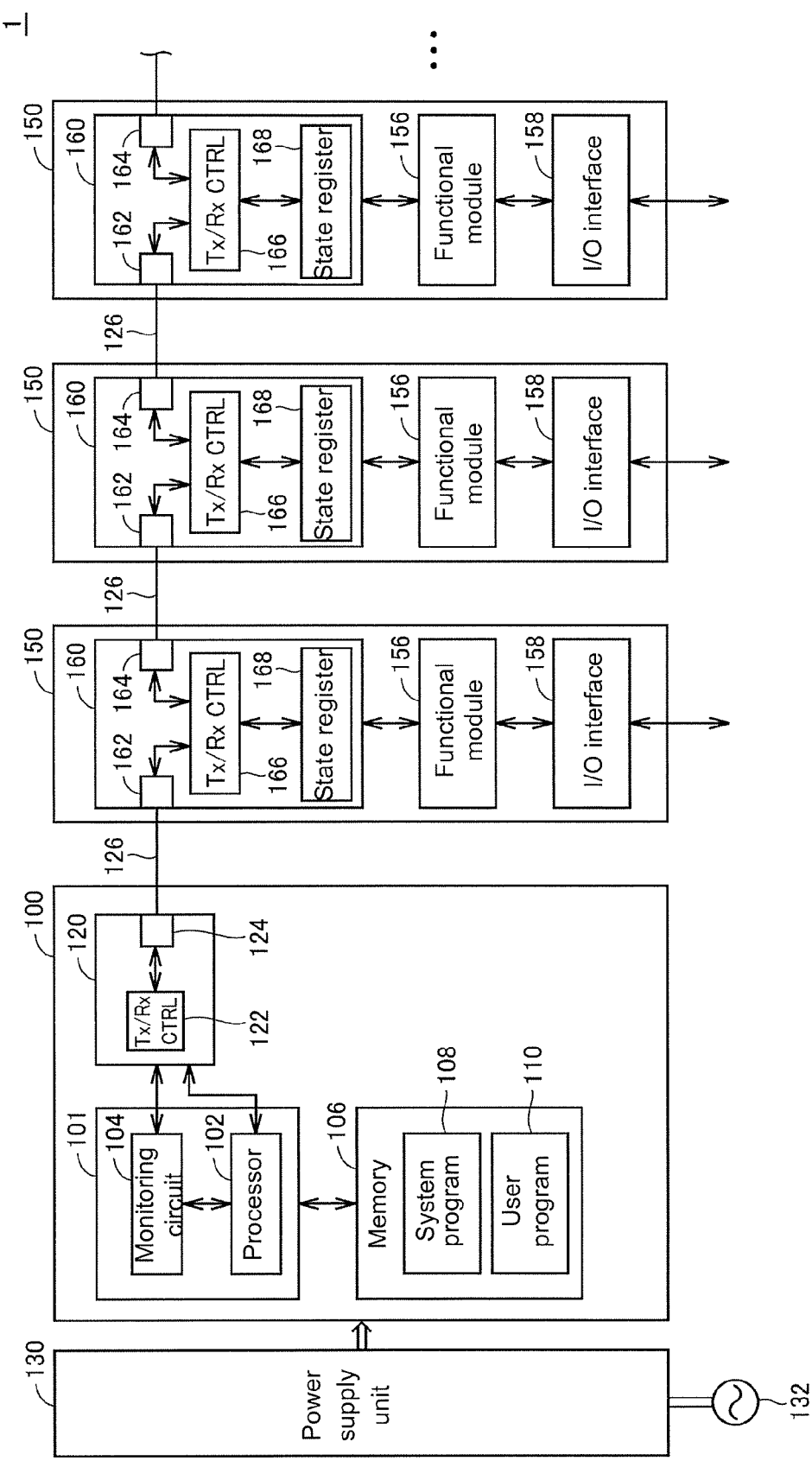
FIG. 1 is a schematic view illustrating the configuration of a main part of a PLC according to this embodiment.

An embodiment of the present invention will be described in detail with reference to the drawings. In the drawings, the same reference numeral is assigned to the same portion or a corresponding portion, and the description thereof will not be repeated.

While a programmable controller (PLC) will be described as a specific example as a typical example of a "control apparatus" in the following description, the technical idea disclosed in the specification can be applied to any control apparatus without being limited to the name "PLC."

<A. Apparatus Configuration>

First, the apparatus configuration of a PLC according to this embodiment will be described. FIG. 1 is a schematic view illustrating the configuration of a main part of the PLC according to this embodiment.

As illustrated in FIG. 1, the PLC 1 according to this embodiment is typically configured by a power supply unit 130, a CPU unit 100, and one or more functional units 150. The CPU unit 100 and one or more the functional units 150 are connected through a local network 126 that is an example of a communication line.

The power supply unit 130 is a power supply unit that supplies power to the CPU unit 100 and the like, receives the supply of power from an external power supply 132 such as a commercial power supply, converts the supplied power into a predetermined voltage, and then supplies the power to the CPU unit 100 and the like. Typically, AC power of 100 V to 240 V is input to the power supply unit 130, and DC power of 5 V is supplied to the CPU unit 100 and the like.

The functional units 150 provide various functions for realizing control of various machines and facilities using the PLC 1 and may typically include an I/O unit, a communication unit, a temperature adjusting unit, an identifier (ID) sensor unit, and the like.

As the I/O unit, for example, a digital input (DI) unit, a digital output unit (DO) unit, an analog input (AI) unit, an analog output (AO) unit, a pulse catch input unit, and a composite unit acquired by mixing a plurality of types of units are cited.

The communication unit relays exchange of data with another PLC, a remote I/O device, functional units, and the like, and for example, may include a communication device or the like that is compliant with any one of protocols such as EtherCAT (registered trademark), EtherNet/IP (registered trademark), DeviceNet (registered trademark), CompoNet (registered trademark), and the like.

The temperature adjusting unit is a control device including an analog input function for acquiring a temperature measurement value and the like, an analog output function for outputting control instructions and the like, and a proportional integral differential (PID) control function. The ID sensor unit is a device that reads data from a radio frequency identifier (RFID) or the like in a non-contacting manner.

The CPU unit 100 is one element configuring the PLC 1 and corresponds to an arithmetic device performing an overall control of the PLC 1. The CPU unit 100 includes an arithmetic processing unit 101, a memory 106, and a communication master circuit 120.

The arithmetic processing unit 101 includes a processor 102 and a monitoring circuit 104. While only the processor 102 is illustrated in FIG. 1 for convenience of description, a plurality of processors may be mounted. In addition, each processor may include a plurality of cores. The monitoring circuit 104 has a hard-wired configuration at least for a main part and thereby realizing processing faster than the processor 102. That is, the monitoring circuit 104 is realized by using hardware logics. For example, the monitoring circuit 104 may be mounted by using a field-programmable gate array (FPGA) that is an example of a programmable logic device (PLD), an application specific integrated circuit (ASIC) that is an example of an integrated circuit (IC), or the like.

In the configuration illustrated in FIG. 1, the arithmetic processing unit 101 is configured by a system-on-chip (SoC) in which the processor 102 and the monitoring circuit 104 are mounted on the same chip. However, the configuration is not limited thereto. Thus, the processor 102 and the monitoring circuit 104 may be mounted as different chips, or at least a part of the memory 106 and the communication master circuit 120 may be further mounted on the same chip.

The memory 106 includes a portion (typically, a volatile memory) for providing a work area that is necessary for the execution of a program in the processor 102 and a portion (typically, a nonvolatile memory) for storing a program executed by the processor 102. As the volatile memory, a dynamic random access memory (DRAM), a static random access memory (SRAM), or the like may be used. As the nonvolatile memory, a flash memory, a hard disk, or the like may be used.

The memory 106 stores a system program 108, a user program 110, and the like. The system program 108 includes an operating system (OS), a library, and the like used for the processor 102 to execute the user program 110. The user program 110 is typically a group of commands for executing at least one of an arithmetic processing (for example, a logical operation or a numerical calculation) using data (input data) acquired from one or a plurality of the functional units 150 and a generation processing of data (output data)

to be transmitted to one or a plurality of the functional units 150 and is arbitrarily generated according to a machine or a facility serving as a control target. As the processor 102 executes the user program 110, control of a facility, a device, or the like using the PLC 1 is realized.

The monitoring circuit 104 is connected to the processor 102 and the communication master circuit 120, detects the occurrence of a predetermined event, and when the occurrence of a certain event is detected, transmits a message associated with the occurring event from the communication master circuit 120. Details of the configuration and the process of the monitoring circuit 104 will be described later.

In the PLC 1 according to this embodiment, the local network 126 is one kind of fixed-period network, and under the control of the communication mater circuit 120 of the CPU unit 100, each of the one or more the functional units 150 repeats transmission of input data to the CPU unit 100 and reception of output data from the CPU unit 100 every predetermined period.

The communication master circuit 120 receives data (input data) collected or generated by the one or more functional units 150 through the local network 126 serving as a communication line, transmits data (output data) acquired or generated by the CPU unit 100 to the one or more functional units 150. The output data corresponds to an instruction value given to a machine, a facility, or the like serving as a control target from each functional unit 150.

As such a fixed-period network, a network following one of known protocols such as EtherCAT (registered trademark), EtherNet/IP (registered trademark), DeviceNet (registered trademark), or CompoNet (registered trademark) may be employed.

In the PLC 1 according to this embodiment, on the local network 126, communication frames having a data structure set in advance are sequentially transferred in a predetermined period, and the CPU unit 100 and each functional unit 150, for the sequentially-transferred communication frames, write designated data in each designated area and read required data from corresponding areas.

The communication master circuit 120 includes a transmission/reception controller 122 and a transmission/reception port 124. The transmission/reception port 124 is a part that is physically connected to the local network 126, generates an electric signal in accordance with an instruction from the transmission/reception controller 122 and transmits the generated electric signal onto the local network 126, and converts an electric signal generated on the local network 126 into a digital signal and outputs the converted digital signal to the transmission/reception controller 122. In addition to the exchange of data through the local network 126, the transmission/reception controller 122 executes time management, management of transmission/reception timings, and the like for guaranteeing the arrival time of data transferred on the local network 126.

Each functional unit 150 includes a functional module 156, an I/O interface 158, and a communication slave circuit 160.

The functional unit 156 is a part that executes a main process of each functional unit 150 and is responsible for collecting field information from a machine, a facility, or the like serving as a control target, outputting an instruction signal to a machine, a facility, or the like serving as a control target, and the like.

The I/O interface 158 is a circuit that relays the exchange of signals with a machine, a facility, or the like serving as a control target.

The communication slave circuit 160 processes communication frames that are sequentially transferred through the local network 126. In other words, when receiving certain communication frames through the local network 126, the communication slave circuit 160 executes data writing and/or data reading for the received communication frames and then transmits the communication frames to a functional unit 150 positioned next on the local network 126. The communication slave circuit 160 provides such a frame relay function.

More specifically, the communication slave circuit 160 includes a transmission/reception controller 166, transmission/reception ports 162 and 164, and a state register 168.

Each of the transmission/reception ports 162 and 164 is a part that is physically connected to the local network 126, generates an electric signal in accordance with an instruction from the transmission/reception controller 166 and transmits the generated electric signal onto the local network 126, and converts an electric signal generated on the local network 126 into a digital signal and outputs the converted digital signal to the transmission/reception controller 166.

The transmission/reception controller 166 performs data writing and/or data reading on the communication frames transferred on the local network 126. The transmission/reception controller 166 includes a counter synchronized with the transmission/reception controller 122 of the communication master circuit 120, and manages the timing of frame transmission on the local network 126 and the like in accordance with the synchronized counter.

The state register 168 is a register that stores flags representing various states in each functional unit 150, for example, a flag representing the operation mode of the functional unit 150 itself, a flag representing the type of an abnormality occurring in the functional unit 150, a flag representing a communication state in the functional unit 150, and the like.

In addition, when receiving a communication frame including a special command or the like, the transmission/reception controller 166 executes a process designated by the special command included in the received communication frame. As such a special command, a command for updating a state value stored in the state register 168 may be included. The process according to this embodiment as will be described below is realized by using such a special command.

<B. Overview of Message Transmitting Process>

Next, an overview of the message transmitting process executed in the PLC 1 according to this embodiment will be described. The CPU unit 100 of the PLC 1 according to this embodiment includes the monitoring circuit 104 that, when the occurrence of a certain event in the CPU unit 100 is detected, transmits a message associated with the occurring event to each functional unit 150. The process of transmitting a message from this monitoring circuit 104 will be described in detail. In the present specification, the term "message" includes an entity of data including the occurrence of an event, content of a process to be executed according to the occurring event, the content of the occurring event, and the like, and the transmission form and the like are not particularly limited. Typically, the message may be stored in the communication frame as described above and transmitted.

Figure 2A:
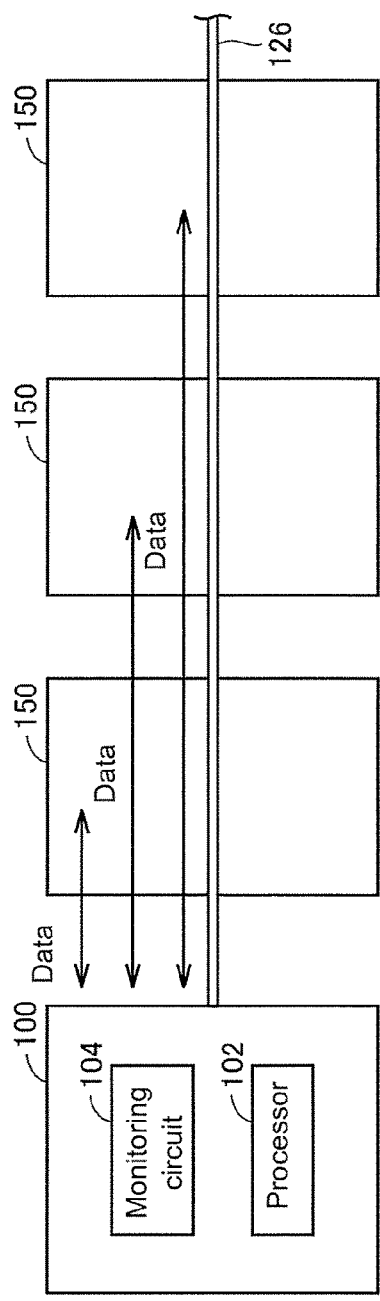
FIG. 2(A) and FIG. 2(B) are schematic views illustrating an overview of a message transmitting process in a PLC according to this embodiment.
Figure 2B:
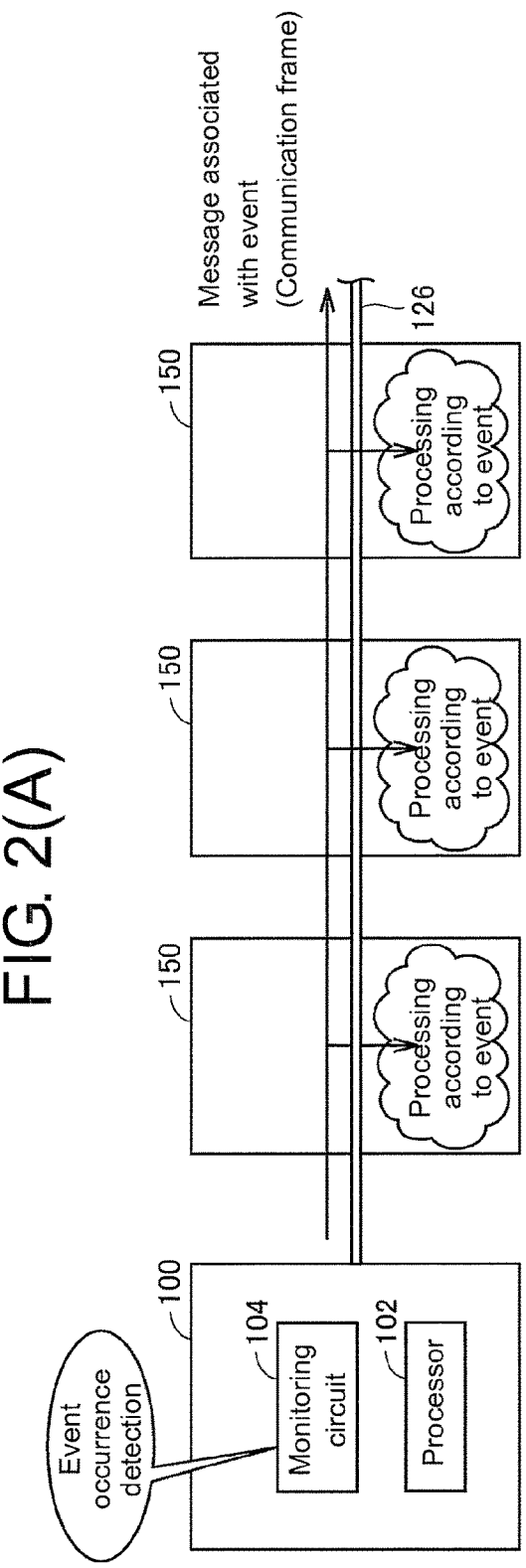

FIG. 2(A) and FIG. 2(B) are schematic views illustrating an overview of a message transmitting process in a PLC 1 according to this embodiment. FIG. 2(A) schematically illustrates exchange of data between the CPU unit 100 and each functional unit 150. As illustrated in FIG. 2(A), input data and output data are exchanged between the CPU unit 100 and each functional unit 150 in a predetermined period.

FIG. 2(B) schematically illustrates a process executed when power supply to the CPU unit 100 is shut off. When an event occurring in the CPU unit 100 is detected, the monitoring circuit 104 of the CPU unit 100 transmits a message associated with the detected event to one or more functional units 150. The transmission of this message is realized by the monitoring circuit 104 giving an instruction to the communication master circuit 120 (FIG. 1). Each functional unit 150 executes a process according to the received message.

As events detected by the monitoring circuit 104, the occurrence of an abnormality in the processor 102, the occurrence of an abnormality in the memory 106 (FIG. 1), a communication abnormality (communication timeout or the like) in the local network 126, shutoff of power supplied to the CPU unit 100, and the like may be considered.

As the process according to a message executed in each functional unit 150, while an arbitrary process may be defined, for example, the process includes a transition to an operation state limiting the operation of the functional unit 150. In description presented below, a normal operation state of the functional unit 150 as illustrated in FIG. 2(A) will be referred to as a "normal operation state," and, an operation state in which the operation of the functional unit 150 is limited will be referred to as a "safe operation state." The names of such states are for convenience of description, and thus the states are not limited to the names.

<C. Configuration of Monitoring Circuit>

Next, the configuration of the monitoring circuit mounted in the PLC 1 according to this embodiment will be described.

Figure 3:
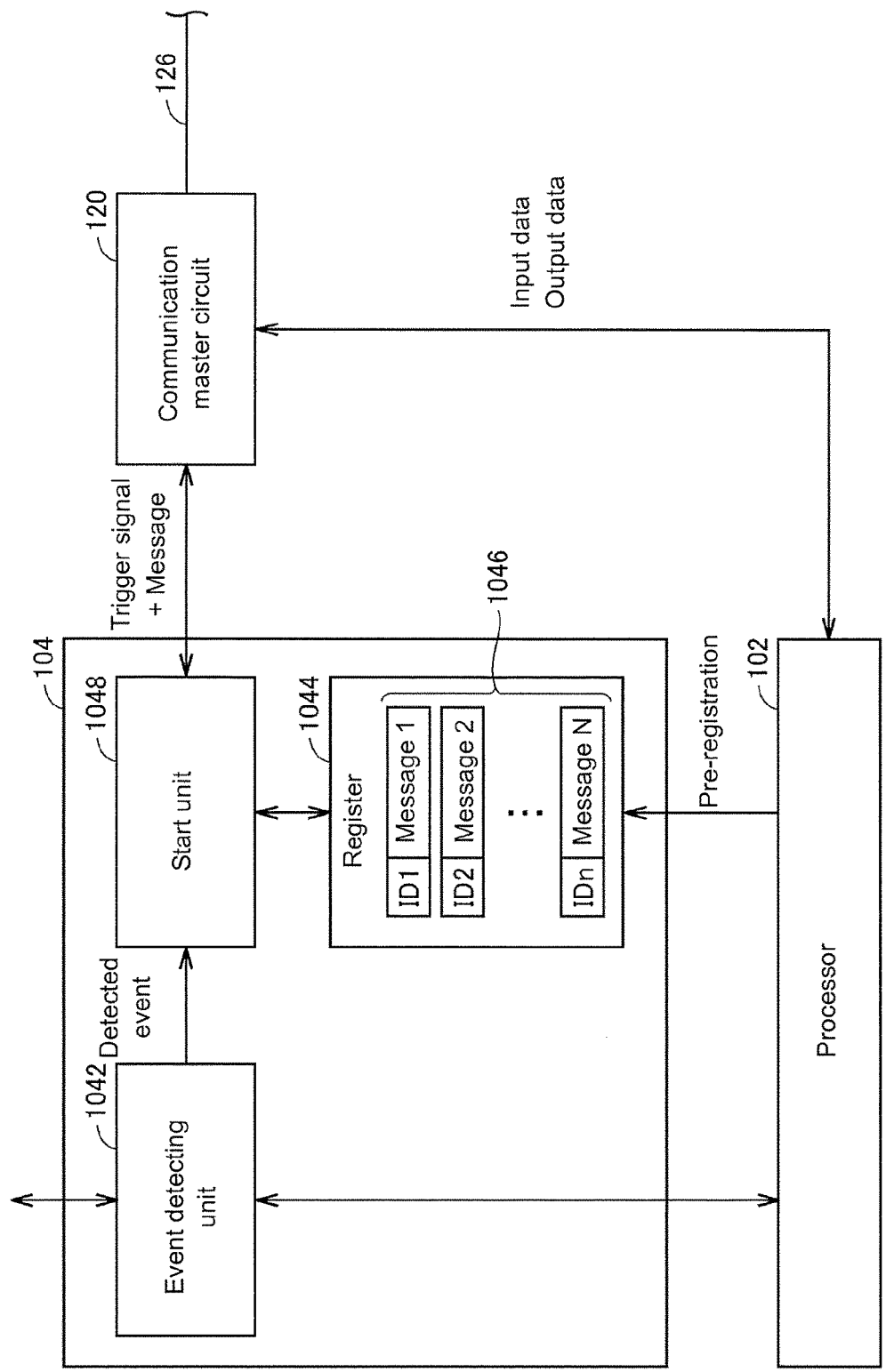
FIG. 3 is a schematic view illustrating the configuration of a monitoring circuit of a PLC according to this embodiment.

FIG. 3 is a schematic view illustrating the configuration of the monitoring circuit 104 of the PLC 1 according to this embodiment. As illustrated in FIG. 3, the monitoring circuit 104 includes an event detecting unit 1042, a register 1044, and a start unit 1048.

The event detecting unit 1042 detects an event occurring in the CPU unit 100 and outputs the detected event to the start unit 1048.

The register 1044 stores a message 1046 associated with each event. In the register 1044, one or more messages 1046 are stored in association with identification information of corresponding events. This message 1046 is typically registered in advance in accordance with a process to be described later. In addition, a message 1046 of the same content may be associated with identification information of different events. In other words, when different events occur, in any case, a message 1046 of the same content may be configured to be transmitted.

The start unit 1048 gives an instruction to the communication master circuit 120 in accordance with an event detected by the event detecting unit 1042 and transmits a message, which is stored in the register 1044, associated with the detected event from the communication master circuit 120. For example, the start unit 1048 reads a message 1046 associated with the identification information of a detected event detected by the event detecting unit 1042 from the register 1044 and gives a trigger signal used for starting the operation of the communication master circuit 120 to the communication master circuit 120 together with the read message 1046.

The communication master circuit 120 generates a communication frame including a designated message in response to the trigger signal from the start unit 1048 and transmits the generated communication frame to each functional unit 150 through the local network 126.

The communication master circuit 120 relays the exchange of input data and output data between the processor 102 and each functional unit 150.

<D. Event Detection>

Next, an example of an event detected by the event detecting unit 1042 and an example of the configuration used for detecting each event will be described.

(d1: Watch Dog Timer)

As an example of the event detecting unit 1042, a watch dog timer for monitoring the soundness of the operation of the processor 102 may be used. The operation of the processor 102 being sound represents a state in which a process of sequentially analyzing and executing commands acquired in advance is performed normally. For example, based on the presence/absence of a certain change generated according to the sequential analysis and execution of commands performed by the processor 102 or the like, the soundness of the operation of the processor 102 can be monitored.

Figure 4:
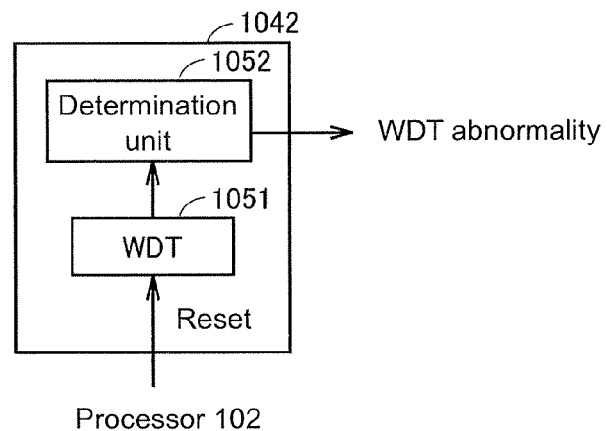
FIG. 4 is a schematic view illustrating an example of the configuration of an event detecting unit included in a monitoring circuit of a PLC according to this embodiment.

FIG. 4 is a schematic view illustrating an example of the configuration of the event detecting unit 1042 included in the monitoring circuit 104 of the PLC 1 according to this embodiment. As illustrated in FIG. 4, the event detecting unit 1042 includes a watch dog timer (WDT) 1051 and a determination unit 1052. The watch dog timer 1051 is a counter for counting up in a predetermined period, and the count value thereof is reset as the watch dog counter 1051 is periodically reset by the processor 102. If the processor 102 does not operate appropriately, the watch dog timer 1051 is not reset, and the counting up is continued. When the count value of the watch dog timer 1051 arrives at a value set in advance, the determination unit 1052 outputs a WDT abnormality. In other words, the event detecting unit 1042 determines that the operation of the processor 102 is not sound and generates an event representing a result of the determination.

In addition, the mounting forms of the watch dog timer 1051 and the determination unit 1052 are arbitrary, and for example, the watch dog timer 1051 may be arranged outside the monitoring circuit 104 and only the determination unit 1052 is arranged in the monitoring circuit 104, and thus the soundness of the operation of the processor 102 may be monitored.

(d2: Memory Error)

As another example of the event detecting unit 1042, a configuration for detecting an abnormality occurring in the memory 106 that can be used by the processor 102 will be described as an example.

Figure 5:
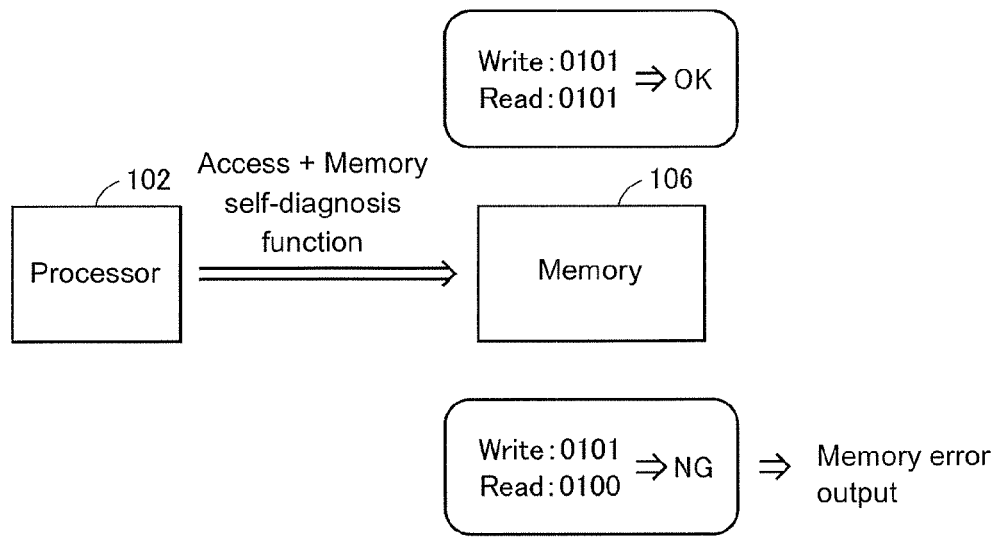
FIG. 5 is a schematic view illustrating an example of the configuration for detecting a memory error mounted in a PLC according to this embodiment.

FIG. 5 is a schematic view illustrating an example of the configuration for detecting a memory error mounted in the PLC 1 according to this embodiment. As illustrated in FIG. 5, when the processor 102 accesses the memory 106, a memory self-diagnosis is performed. The memory diagnosis function is a function for diagnosing the presence/absence of an error for data written in a memory space of the memory unit or data read from the memory space.

For example, after the processor 102 accesses the memory 106 and writes certain data into the memory 106, the processor 102 reads out the written data again, and determines whether there is a match/mismatch with the written data. For example, after data "0101" is written into the memory 106, the written data is read from the memory 106 again, and if the data is "0101", it can be determined that correct writing and reading has been executed. On the other hand, even if the data written into the memory 106 is "0101", but the data read out is "0100", it can be determined that data writing or reading is not correctly executed. In such a case, a memory error abnormality is output. In other words, the event detecting unit 1042 determines that a memory error occurs in the memory 106 and generates an event indicating the memory error.

As the method of detecting a memory error, not only software error detection as described above, but hardware error detection may also be employed by using an error check and correct (ECC) memory or the like. In addition, the form of mounting such error detection is arbitrary.

(d3: Communication Abnormality)

As a further another example of the event detecting unit 1042, a configuration for detecting a communication abnormality in the communication master circuit 120 that is a communication circuit will be described.

Figure 6:
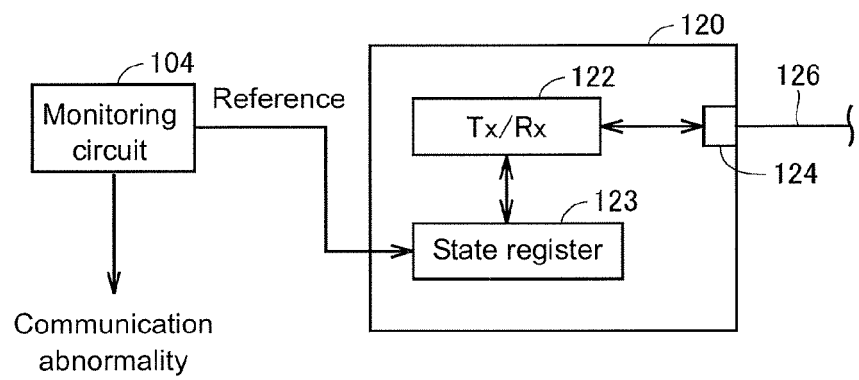
FIG. 6 is a schematic view illustrating an example of the configuration for detecting a communication abnormality mounted in a PLC according to this embodiment.

FIG. 6 is a schematic view illustrating an example of the configuration for detecting a communication abnormality mounted in the PLC 1 according to this embodiment. As illustrated in FIG. 6, the communication master circuit 120 includes a state register 123 connected to the transmission/reception controller 122. The state register 123 is a register storing a flag value representing a communication state of the communication master circuit 120 and the like, and for example, a flag representing the operation mode of the communication master circuit 120 itself, a flag representing the type of abnormality occurring in the local network 126, a flag representing the state of each slave connected to the local network 126, and the like.

The monitoring circuit 104 regularly refers to the state register 123 of the communication master circuit 120 so to determine whether or not a flag value representing a certain abnormality is not set. In other words, when a flag representing an abnormality of the local network 126 is set in the state register 123, the monitoring circuit 104 determines a communication abnormality, and the communication abnormality is output.

As a method of detecting a communication abnormality, an arbitrary method may be employed, and for example, a method for monitoring a time until a frame transmitted by the communication master circuit 120 is returned to the communication master circuit 120 may be employed. In addition, the mounting form of such detection of the communication abnormality is arbitrary.

(d4: Shutoff of Power Supply)

As another example of the event detecting unit 1042, a configuration for detecting the shutoff of power supply to the CPU unit 100 will be described.

Figure 7:
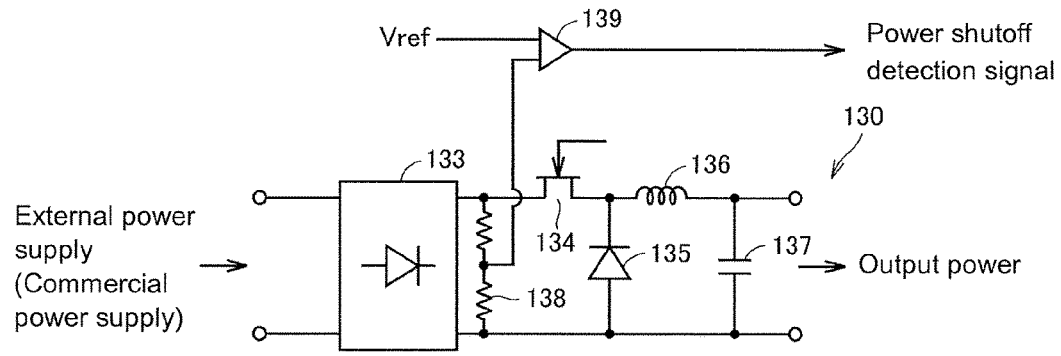
FIG. 7 is a schematic view illustrating an example of the configuration for detecting shutoff of power supply mounted in a PLC according to this embodiment.

FIG. 7 is a schematic view illustrating an example of the configuration for detecting shutoff of power supply mounted in the PLC 1 according to this embodiment. As illustrated in FIG. 7, the power supply unit 130 (FIG. 1) includes an AC-to-DC conversion circuit that receives AC power from an external power supply such as a commercial power supply and outputs DC power. More specifically, the power supply unit 130 includes a rectification unit 133, a switching unit 134, a diode 135, an inductor 136, and a capacitor 137. The switching unit 134, the diode 135, the inductor 136, and the capacitor 137 configure one kind of a switching regulator. In other words, according to a switching operation in the switching unit 134 configured by a field effect transistor or the like, DC power having a predetermined voltage is output.

For example, by disposing a voltage-dividing resistor 138 on the output side of the rectification unit 133 of the power supply unit 130 and comparing electric potential generated in the voltage-dividing resistor 138 with reference electric potential Vref by using a comparator 139, the shutoff of power supply from the external power supply can be detected. In other words, by appropriately setting the reference electric potential Vref, when the power supply from the external power supply is shut off for any reason, the electric potential generated in the voltage-dividing resistor 138 is lowered to be below the reference electric potential Vref In this state, the comparator 139 outputs a power shutoff detection signal. In other words, when electric potential generated in the voltage-dividing resistor 138 is decreased, it is detected that the power supply is shut off.

In addition, the comparator 139 illustrated in FIG. 7 may be configured to be included in the monitoring circuit 104. While the method of detecting shutoff of the supplied power by measuring a voltage or electric potential that is actually generated according to the example of the configuration of the power supply unit 130 has been illustrated in FIG. 7 as an example, the configuration is not limited thereto, but an arbitrary circuit configuration and an arbitrary detection circuit may be employed.

<E. Content of Message>

Next, an example of the content of a message transmitted when a certain event occurs will be described.

(e1: State Transition Notification)

As a message associated with an event, a command for a transition to an operation state (safe operation state) in which the operation of each functional unit 150 is limited may be included. For example, in the case of an abnormality of the processor 102 according to the activation of the watch dog timer in the CPU unit 100, shutoff of power supply to the CPU unit 100, or the like, the operation state of each functional unit 150 may transition from the "normal operation state" to the "safe operation state."

At this time, the monitoring circuit 104 of the CPU unit 100 gives a message including a command for a transition from the "normal operation state" to the "safe operation state" to each functional unit 150, and each functional unit 150 receives this message and causes the operation state to transition.

In addition, each functional unit 150 has various abnormality detection logics, and such abnormality detection logics generate an abnormality log when an abnormality occurs in the CPU unit 100. When an abnormality log is generated by each functional unit 150, the abnormality log "overflows," and it may cause a problem in the operation or the maintenance. Thus, as an example of the limited operation in the safe operation state, a process of invalidating such an abnormality detection logic and masking an unnecessary abnormality log may be included. In other words, the limited operation in the safe operation state includes invalidating of a part or all of the abnormality detection logics.

According to the transition of each functional unit 150 to the safe operation state, each functional unit 150 invalidates all or some of the abnormality detection logics. In addition, in the safe operation state, an output signal from the functional unit 150 may be set to a predetermined value. For example, the output signals from the functional units 150 connected to the local network 126 may be set to False (Off or "0"), in other words, set to a load shutoff output.

Figure 8A:
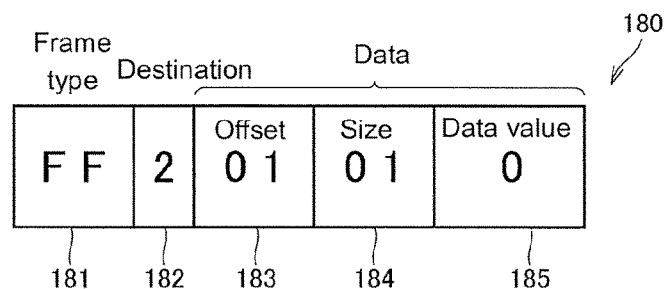
FIG. 8(A) and FIG. 8(B) are schematic views illustrating a state transition frame used in a PLC according to this embodiment and processing content thereof.
Figure 8B:
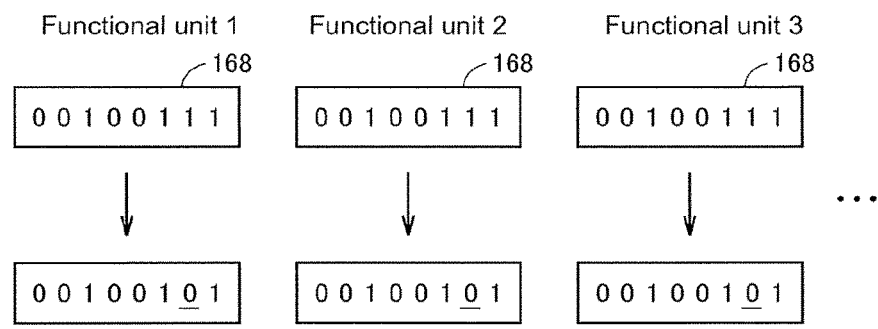

FIG. 8(A) and FIG. 8(B) are schematic views illustrating a state transition frame used in the PLC 1 according to this embodiment and processing content thereof. The state transition frame, as an example of a message associated with the event described above, corresponds to one including a command for transitioning each functional unit 150 to the safe operation state.

FIG. 8(A) illustrates an example of the data structure of the state transition frame 180. The state transition frame 180 includes a data type section 181 and a destination designation section 182 as a header section and includes an offset section 183, a size section 184, and a data value section 185 as a data main body section.

The data type section 181 is an area in which a value representing the type of a frame is stored, and in the example illustrated in FIG. 8(A), a value representing a frame to execute a designated command in the functional unit 150 that has received the frame is stored. The destination designation section 182 is an area in which a value representing the transmission destination of the frame is stored. In the destination designation section 182, an address on the network is designated in the case of unicast, information representing a plurality of transmission destinations is designated in the case of multicast, and a specific value is designated in the case of broadcast.

In the data main body section of the frame illustrated in FIG. 8(A), a command for writing data is stored. More specifically, an offset value representing the start position of an area in which data is written is stored in the offset section 183, the size of an area in which data is written is stored in the size section 184, and the value of actually written data is stored in the data value section 185.

FIG. 8(B) illustrates an example of the state register 168 included in the communication slave circuit 160 of each functional unit 150. In the PLC 1 according to this embodiment, each functional unit 150 executes setting of an operation state, a determination of presence/absence of an abnormality, or the like in accordance with the value of the flag set in the state register 168. In the example illustrated in FIG. 8(B), a second bit (second bit from the right side) from the low rank of the state register 168 illustrates the operation state of each functional unit 150.

When the state transition frame 180 illustrated in FIG. 8(A) is received, each functional unit 150 updates the content of the state register 168 in accordance with a command included therein. In the example illustrated in FIG. 8(B), in each functional unit 150, the second bit from the low rank of the state register 168 is updated. Accordingly, each functional unit 150 causes the operation state to transition from the "normal operation state" to the "safe operation state." Each functional unit 150 transitions to the "safe operation state," thereby executing invalidation of abnormal detection logics and/or setting to the load shutoff output.

As illustrated in FIG. 8(A) and FIG. 8(B), by using the state transition frame used for updating the value of the flag representing the operation state of each functional unit 150 as a message, the configuration and the process of a communication frame transmitted from the monitoring circuit 104 of the CPU unit 100 can be simplified, and the process of each functional unit 150 does not need to be managed on the CPU unit 100 side. In other words, since the process at the time of the occurrence of a certain important event in the CPU unit 100 does not need to be managed on the CPU unit 100 side, the design and the maintenance of the system can be easily executed.

(e2: Individual Designation)

As a message associated with an event, for each event, a command targeted only for specific functional units 150 and/or a command for executing a specific process may be included.

Figure 9:
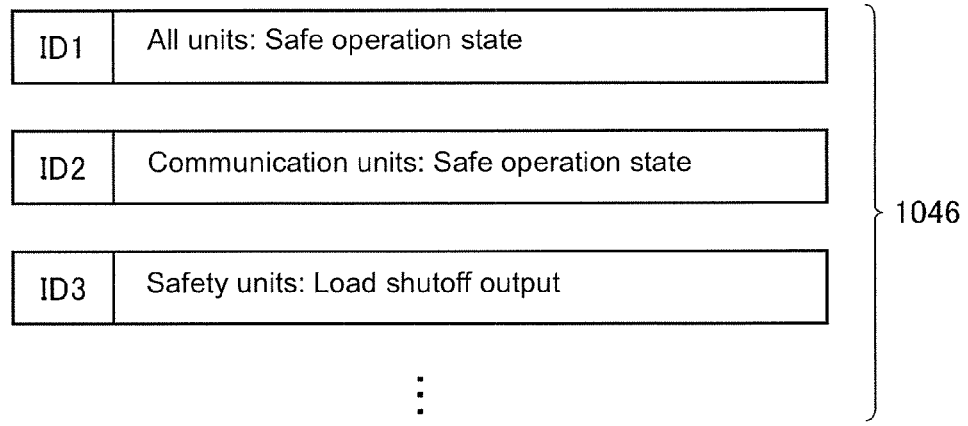
FIG. 9 is a diagram illustrating an example of a message of individual designation used in a PLC according to this embodiment.

FIG. 9 is a diagram illustrating an example of a message of individual designation used in the PLC 1 according to this embodiment. As illustrated in FIG. 9, for example, "all units: safe operation state" representing a transition of all the functional units 150 to the safe operation state is set in association with an event of ID1, "communication units: safe operation state" representing a transition of communication units among the functional units 150 connected to the local network 126 to the safe operation state is set in association with an event of ID2, and "safety units: load shutoff output" representing all the output signals from safety units among the functional units 150 connected to the local network 126 are set to the load shutoff output set to False (Off or "0") in association with an event of ID3.

In this way, for each occurring event, the content of the message and/or target functional units 150 may be set differently. By using such a function, for example, only for functional units 150 of a specific type among a plurality of functional units 150 connected to the local network 126, unnecessary abnormality logs may be directed to be masked. The communication unit or the like constantly monitors the communication states of a higher rank network and a lower rank network, and accordingly, when the communication with the CPU unit 100 cannot be executed, there is a possibility that a large amount of abnormality logs may be generated. For this reason, an instruction for invalidating abnormality detection logics may be given only to the functional units 150 of such a specific type.

By including a different instruction in the communication frame for each functional unit 150, the process according to a machine or a facility serving as a control target can be safely executed.

(e3: Information Representing Content of Event)

As a message associated with an event, information representing the content of the associated event may be configured to be included.

Figure 10:
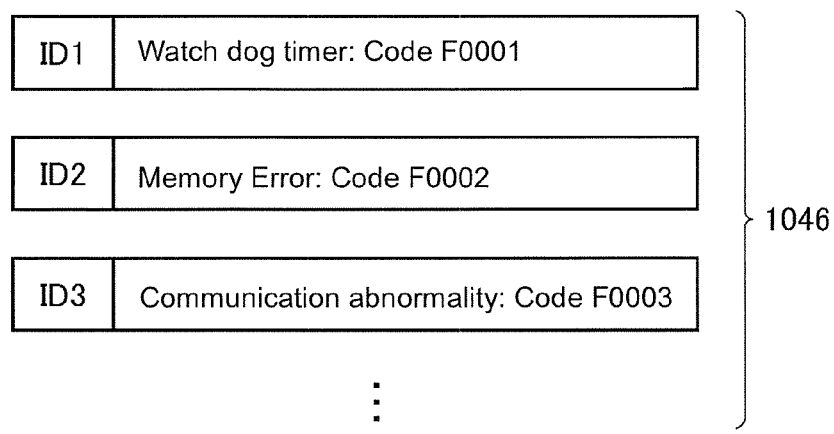
FIG. 10 is a diagram illustrating an example of a message including information representing the content of an event used in a PLC according to this embodiment.

FIG. 10 is a diagram illustrating an example of a message including information representing the content of an event used in the PLC 1 according to this embodiment. As illustrated in FIG. 10, for example, when detection of a processor abnormality using a watch dog timer is associated as an event of ID1, as a message, "watch dog timer" and a code "F0001" representing it are included. For example, when detection of a memory error is associated as an event of ID2, as a message, "memory error" and a code "F0002" representing it are included. For example, when detection of a communication abnormality is associated as an event of ID3, as a message, "communication abnormality" and a code "F0003" representing it are included.

In this way, when information representing the content of an occurring event is included in a message, a process to be executed according to the occurring event is set in each functional unit 150 in advance. When a certain message is received, each functional unit 150 can be aware of the occurring event based on the content of the received message and execute the process set in advance for the occurring event.

In this way, by including the information representing the content of an occurring event in the message, each functional unit 150 can be aware of the content of the occurring event, and a more optimal process can be executed according to the occurring event in each functional unit 150.

<F. Pre-Registration of Message>

In the PLC 1 according to this embodiment, a communication frame including a message associated with an occurring event in advance is transmitted. In order to increase the degree of freedom of the message to be transmitted, the processor 102 executes a system program 108 (a kind of firmware) at the time of system start-up or the like, to freely set a message to be transmitted by the monitoring circuit 104.

Figure 11A:
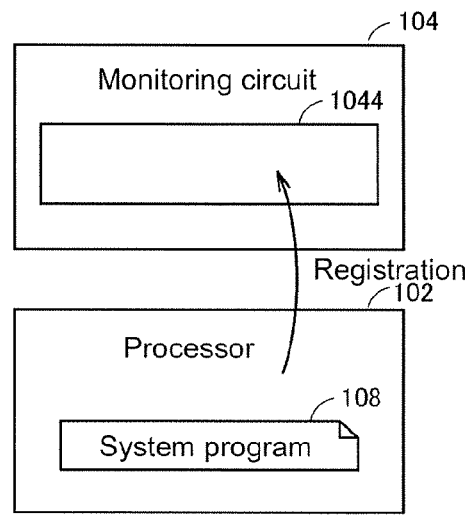
FIG. 11(A) and FIG. 11(B) are schematic views illustrating a process relating to pre-registration of a message in a PLC according to this embodiment.
Figure 11B:
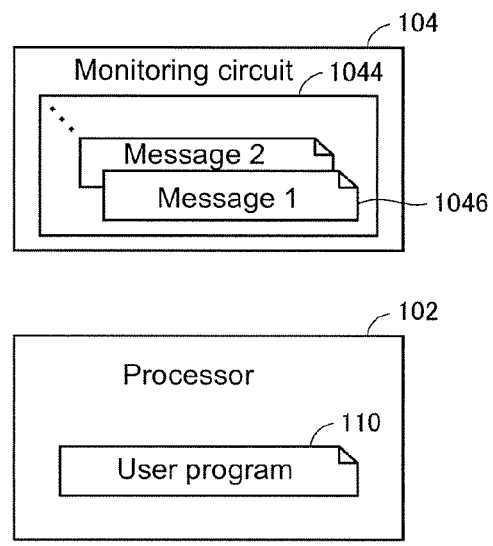

FIG. 11(A) and FIG. 11(B) are schematic views illustrating a process relating to pre-registration of a message in the PLC 1 according to this embodiment. As illustrated in FIG. 11(A), at the startup of the CPU unit 100, the processor 102 executes the system program 108. According to the execution of the system program 108, an environment for executing the user program 110 is formed. As a part of the system program 108, a process of registering one or a plurality of messages 1046 in the register 1044 of the monitoring circuit 104 is included.

As illustrated in FIG. 11(B), in a state in which the message 1046 is pre-registered in the register 1044 of the monitoring circuit 104, the processor 102 executes the user program 110, and the monitoring circuit 104 monitors the occurrence of an event set in advance. In this way, the processor 102 executes the system program 108 (or firmware), whereby a message transmitted from the communication master circuit 120 is pre-registered before the start of execution of the user program 110.

As described above, when the occurrence of a certain event is detected, the monitoring circuit 104 transmits a message (or a communication frame including the message) associated with the occurring event in advance from the communication master circuit 120. In this way, the monitoring circuit 104 serving as a hardware logic has a function of transmitting a communication frame in addition to the function of monitoring the occurrence of an event.

In this embodiment, an arbitrary message can be registered in the register 1044 of the monitoring circuit 104 by using the system program 108 executed by the processor 102. For this reason, by registering a message according to the configuration, the use, and the like of the PLC 1, an optimal process executed at the time of the occurrence of an event influencing the continuation of the operation of the PLC 1 and the like can be set.

In the CPU unit 100 according to this embodiment, regarding the event occurrence detection function and the communication frame transmission function, by using the hardware logic, it is possible to realize a system with high degree of freedom by realizing high speed and employing a configuration in which the message can be freely set by the system program 108.

<G. Procedure of Event Occurrence Detection and Message Transmission>

Figure 12:
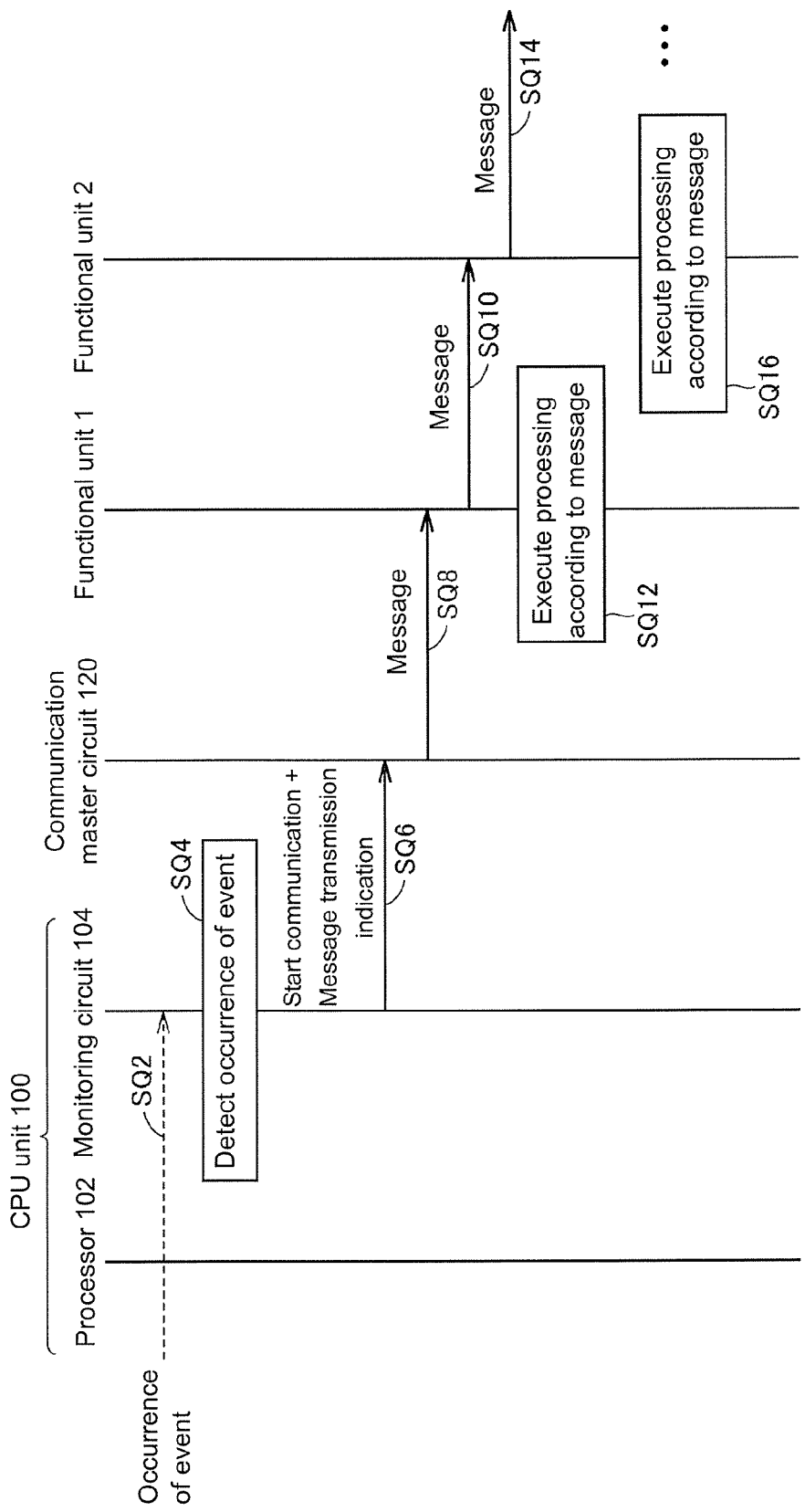
FIG. 12 is a sequence diagram illustrating the processing sequence of detection of the occurrence of an event and the transmission of a message in a PLC according to this embodiment.

Next, the procedure of the event occurrence detection and the message transmission provided by the PLC 1 according to this embodiment will be described. FIG. 12 is a sequence diagram illustrating the procedure of the event occurrence detection and the message transmission provided by the PLC 1 according to this embodiment. FIG. 12 illustrates the processing sequence executed in the PLC 1 formed by the CPU unit 100 and a plurality of functional units 150 (in the example illustrated in FIG. 12, for convenience of description, two functional units) as illustrated in FIG. 1.

When a certain event occurs (Sequence SQ2), the monitoring circuit 104 of the CPU unit 100 detects the event that has occurred (Sequence SQ4). Then, the monitoring circuit 104 directs the communication master circuit 120 to start communication and instructs the monitoring circuit 104 to transmit a message (or a communication frame including the message) registered in advance (Sequence SQ6).

In accordance with this direction, the communication master circuit 120 transmits the message (or a communication frame including the message) to one or a plurality of functional units 150 through the local network 126 (Sequence SQ8).

When a message is received from the upstream side, the functional unit 150 (the "functional unit 1" illustrated in FIG. 12) arranged at a position closest to the communication master circuit 120 in the local network 126 transmits the received message to the downstream side (Sequence SQ10) and executes a process (for example, a transition to the safe operation state as described above) according to the received message (Sequence SQ12).

The next functional unit 150 (the "functional unit 2" illustrated in FIG. 12) that has received the transferred message, similarly transfers the received message to a further downstream side (Sequence SQ14) and executes the process according to the received message (Sequence SQ16).

Hereinafter, the reception of the message from the upstream side, transferring of the received message to the downstream side, and the execution of the process according to the received message are performed in each functional unit 150.

In addition, according to the occurring event, the monitoring circuit 104 may be configured to stop power supply to the communication master circuit 120 after the elapse of a predetermined time from the direction of the start of communication for the communication master circuit 120.

By employing such a series of the processing sequence, when a certain event occurs in the CPU unit 100 or the like, a necessary process and the like can be started in a speedy manner in accordance with the occurring event.

<H. Other Application Examples>

In the description presented above, a configuration in which a message associated with the occurring event is transmitted to one or a plurality of functional units 150 connected to the CPU unit 100 through the local network 126 has been mainly described. However, a similar scheme may also be applied to one or a plurality of functional units 150 connected through a field network.

Figure 13:
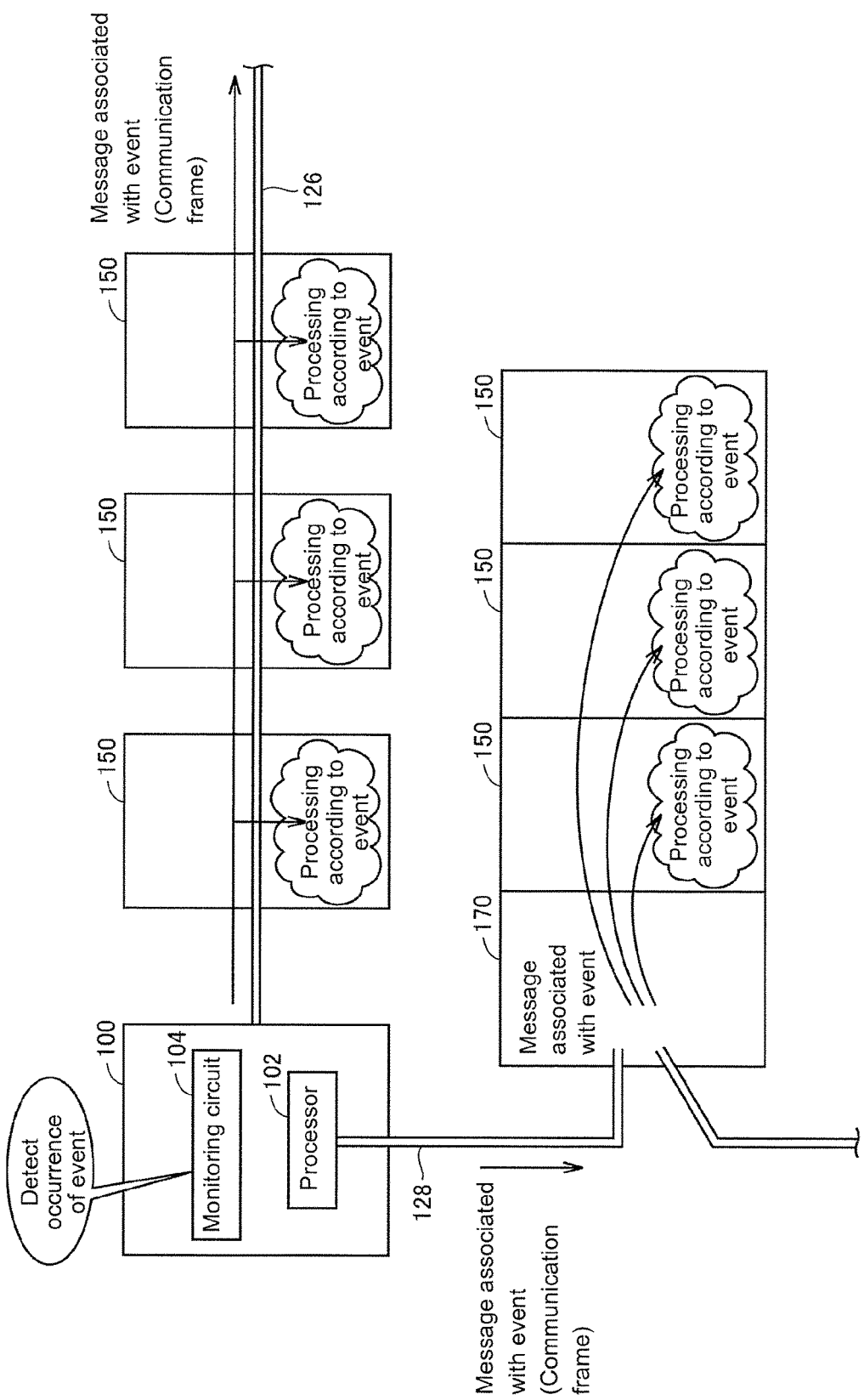
FIG. 13 is a schematic diagram illustrating the configuration of another main part of a PLC according to this embodiment.

FIG. 13 is a schematic view illustrating the configuration of another main part of a PLC according to this embodiment. As illustrated in FIG. 13, a CPU unit 100 of a PLC 1 is connected to one or a plurality of functional units 150 through a local network 126 and is also connected to a remote I/O device (a communication coupler unit 170 and one or more functional units 150) through a field network 128.

Also in such a configuration, when a certain event is detected, the monitoring circuit 104 of the CPU unit 100 transmits a message associated with the occurring event through the local network 126. In response to such a message, each of the one or more of functional units 150 connected to the local network 126 and each of the one or more functional units 150 connected to the field network 128 execute the process according to the notified message.

In this way, the message transmitting process according to this embodiment can be applied to not only the functional units 150 connected to the CPU unit 100 through the local network 126 but also functional units 150 connected through the field network 128.

While the CPU unit 100 including both the local network 126 and the field network 128 is illustrated as an example in FIG. 13 for convenience of description, a CPU unit 100 including only the field network 128 may be similarly applied.

<I. Advantages>

According to the CPU unit 100 according to this embodiment, when the occurrence of a certain event is detected by the CPU unit 100, a communication frame including a message associated with the occurring event can be transmitted to one or a plurality of functional units 150 through a communication line through which input data and output data are exchanged. According to the communication frame including this message, each functional unit 150 executes the process according to the message. By employing such a configuration, a dedicated line used for transmitting a message is not necessary, and cost reduction can be realized. In addition, even when a fixed-period network employing a general communication protocol or the like is employed, the process according to the occurring event can be executed in each functional unit 150.

According to the CPU unit 100 according to this embodiment, the functions of detecting an occurring event and transmitting a communication frame including a message associated with the detected event are realized by using hardware logics, and accordingly, a time required for transmitting a message after the occurrence of a certain event can be shortened.

According to the CPU unit 100 according to this embodiment, a plurality of events can be set as detection targets, and a message associated with each event can be arbitrary set, whereby a system having a high degree of freedom can be realized.

In the PLC 1 according to this embodiment, a state transition frame can also be transmitted, and when such a state transition frame is used, each functional unit 150 can be configured to transition to the safe operation state. By causing the transition to the safe operation state, some or all of the abnormality detection logics of each functional unit 150 can be invalidated, and accordingly, when the CPU unit 100 is restored or the like, a situation in which abnormality logs overflow can be avoided.

The embodiments described here should be considered not to be limiting but to be exemplary in every aspect. The scope of the present invention is represented not by the description presented above but by the claims and is intended to include all the changes in the meaning and range of equivalency to the claims.

What is claimed is:

1. An arithmetic device constituting a control apparatus, the arithmetic device comprising:
    a communication circuit, exchanging data with one or a plurality of functional units through a communication line, wherein each functional unit exchanges signals with a control target comprising a machine or a facility, and comprises at least one abnormality detection logics for generating an abnormality log when an abnormality occurs;
    a processor, executing a user program to perform at least one of an arithmetic processing using data acquired from the one or plurality of functional units and a generation processing of data to be transmitted to the one or plurality of functional units; and
    a monitoring circuit, connected to the communication circuit and the processor,
    wherein the monitoring circuit includes:
    a detection unit that detects an event occurring in the arithmetic device;
    a storage unit that stores a message associated with the event; and
    a start unit that gives an instruction to the communication circuit in accordance with the event detected by the detection unit and transmits the message, which is stored in the storage unit, associated with the detected event from the communication circuit,
    wherein the message for the event comprises a command for transitioning each functional unit to an operation state in which an operation of each functional unit is limited, and the limited operation comprises invalidating of a part or all of the abnormality detection logics.

2. The arithmetic device according to claim 1, wherein the detection unit includes a watch dog timer that monitors soundness of an operation of the processor.

3. The arithmetic device according to claim 1, wherein
    the arithmetic device further comprising a memory that is used by the processor, and
    the detection unit detects an abnormality occurring in the memory.

4. The arithmetic device according to claim 1, wherein the detection unit monitors a communication abnormality in the communication circuit.

5. The arithmetic device according to claim 1, wherein the detection unit detects a shutoff of a power supply to the arithmetic device.

6. The arithmetic device according to claim 1, wherein the message includes information representing content of an associated event.

7. The arithmetic device according to claim 1, wherein the processor stores the message in the storage unit by executing a program before a start of an execution of the user program.

8. The arithmetic device according to claim 1, wherein the monitoring circuit is mounted using a field-programmable gate array or an application-specific integrated circuit.

9. A control apparatus comprising:
    an arithmetic device; and
    one or a plurality of functional units,
    wherein the arithmetic device comprises:
    a communication circuit, exchanging data with the one or a plurality of functional units through a communication line, wherein each functional unit exchanges signals with a control target comprising a machine or a facility, and comprises at least one abnormality detection logics for generating an abnormality log when an abnormality occurs;
    a processor, executing a user program to perform at least one of an arithmetic processing using data acquired from the one or plurality of functional units and a generation processing of data to be transmitted to the one or plurality of functional units; and
    a monitoring circuit that is connected to the communication circuit and the processor,
    wherein the monitoring circuit comprises:
    a detection unit that detects an event occurring in the arithmetic device;
    a storage unit that stores a message associated with the event; and
    a start unit that gives an instruction to the communication circuit in accordance with the event detected by the detection unit and transmits the message, which is stored in the storage unit, associated with the detected event from the communication circuit,
    wherein the message for the event comprises a command for transitioning each functional unit to an operation state in which an operation of each functional unit is limited, and the limited operation comprises invalidating of a part or all of the abnormality detection logics.

* * * * *